United States Patent Office 3,277,122
Patented Oct. 4, 1966

3,277,122
PROCESS FOR THE PREPARATION OF 19-NOR-
$\Delta^{4,9(10)}$-3-KETO STEROIDS
Francisco Alvarez, Palo Alto, Calif., assignor to Syntex Corporation, Panama, Panama, a corporation of Panama
No Drawing. Filed Oct. 23, 1964, Ser. No. 406,181
Claims priority, application Mexico, June 1, 1964, 77,273
15 Claims. (Cl. 260—397.3)

This invention relates to a novel process for the preparation of cyclopentanopolyhydrophenanthrene derivatives.

More particularly, this invention relates to a novel process for the preparation of 19-nor-$\Delta^{4,9(10)}$-3-keto steroids, e.g., 19-nor-$\Delta^{4,9(10)}$-3-keto androstadienes and 19-nor-$\Delta^{4,9(10)}$-3-keto pregnadienes in good yield and with a minimum of by-product formation, which comprises reacting a 10-carboxy-$\Delta^4$-3-keto steroid with about 1 molar equivalent of iodide in the presence of a tertiary amine such as pyridine, to remove the 10-carboxyl group from said 10-carboxy-$\Delta^4$-3-keto steroid and, at the same time, also introduce unsaturation at the 9(10)-position.

Included among the 19-nor-$\Delta^{4,9(10)}$-3-keto steroids which can be prepared by the novel process of the present invention are those 19-nor-$\Delta^{4,9(10)}$-3-ketoandrostadienes and 19-nor-$\Delta^{4,9(10)}$-3-ketopregnadienes disclosed in U.S. Patent No. 3,086,027 to Perelman et al.

This novel process can be carried out using any 10-carboxy-$\Delta^4$-3-keto steroid starting material, e.g., any of those represented by Formula I in the following reaction sequence:

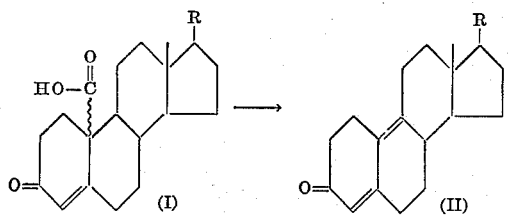

In the formulas R represents a keto group; the grouping

wherein $R^1$ represents hydrogen or an acyl group containing less than 12 carbon atoms and $R^2$ represents hydrogen, a lower alkyl group, such as methyl, ethyl, propyl, butyl, hexyl, and the like, a lower alkenyl group, such as vinyl, allyl, and the like, or a lower alkynyl (including halo-lower alkynyl) group, such as ethynyl, fluoroethynyl, chloroethynyl, bromoethynyl, propynyl, trifluoropropynyl, butynyl, hexynyl, and the like; or the grouping:

wherein $R^3$ and $R^4$ each represent hydrogen, a hydroxyl group or an acyloxy group containing less than 12 carbon atoms, and $R^3$ and $R^4$, taken together with the 20-keto group, can represent a 17,20;20,21-bismethylenedioxy grouping, and the symbol ξ indicates that the carboxyl group attached to the 10-position of the steroid nucleus in the starting material can be in either the α- or the β-configuration.

In addition to the foregoing 17-substituents, the 10-carboxy-$\Delta^4$-3-keto steroids which can be employed as starting material in the process of the present invention can also contain other non-interfering substituents, e.g., keto groups or derivatives thereof, such as enolized or ketolized keto groups; hydroxyl groups or derivatives thereof, such as esterified or etherified hydroxyl groups and, in the case a pair of hydroxyl groups, e.g., a 16α-hydroxyl group and a 17α-hydroxyl group, acetal and ketal derivatives thereof; alkyl groups, such as methyl, ethyl or propyl groups; halogen atoms, such as fluorine or chlorine, and the like, at one or more of positions 1, 2, 4, 6, 7, 8, 11, 12, 13, 14, 15, 16, 17, 18, 20 and 21 on the steroid nucleus, and can belong to the estrane, pregnane, spirostane, cholane, cholestane, stigmastane or cardanolide series.

The acyloxy and acyl groups referred to herein are preferably derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

In carrying out the novel process of the present invention, the starting 10-carboxy-$\Delta^4$-3-keto steroid (I) is dissolved in an aromatic, heterocyclic tertiary amine, preferably one which contains only carbon, nitrogen and hydrogen, has from 5 to 9 carbon atoms, inclusive, and is normally a liquid at room temperature, such as pyridine, α-collidine, β-collidine, γ-collidine, 2,4-lutidine, 2,6-lutidine, 3,4-lutidine, quinoline, isoquinoline, α-picoline, β-picoline, γ-picoline, or the like, containing at least about 1 molar equivalent of iodine.

The aromatic amine will be employed in an amount sufficient to insure the complete dissolution of the steroid starting material, e.g., an amount ranging from about 3 cc. to about 100 cc., and preferably from about 10 cc. to about 15 cc. per grain of steroid starting material.

Similarly, the iodine will preferably be present in amounts ranging from 1 to 1.1 molar equivalents per molar equivalent of steroid starting material.

Inert organic solvents or diluents, e.g., aromatic hydrocarbons such as benzene, toluene or xylene; chlorinated hydrocarbons such as methylene dichloride, carbon tetrachloride, chlorobenzene, and the like, can also be present in varying amounts, if desired.

The reaction is carried out by heating the thus-prepared reaction mixture to a temperature of at least about 50° C. e.g., from about 50° C. to about 180° C., and preferably at from about 100° C. to about 120° C., for from about 2 to about 24 hours or longer, at atmospheric pressure, although higher temperatures coupled with shorter reaction times, and pressures above or below atmospheric, can also be employed, if desired. Thus, the particular reaction conditions given above, other than the minimum temperature, are not critical, but merely represent the best mode of carrying out the novel process of the present invention known at the present time. Similarly, the order of addition of the reactants is not critical, and can be varied from that given above. Finally, besides molecular iodine, other sources of iodine, e.g., iodinating agents or iodine carriers such as N-iodoacetamide, N-iodosuccinimide, trimethylammonium iodide periodide, pyridine periodide hydroiodide, and the like, can also be employed in amounts sufficient to provide the necessary amount of iodine.

Included among the 10-carboxy-$\Delta^4$-3-keto steroids which can be employed as starting materials in practicing the novel process of the present invention are:

10β-carboxy-$\Delta^4$-estrene - 3,17-dione, 10α-carboxy-$\Delta^4$-estrene-3,17-dione, 10β-carboxy-$\Delta^4$-estren - 17β-ol-3-one, 10β-carboxy - $\Delta^4$-estren - 17β-ol-3-one 17-acetate, 17α-methyl-10α-carboxy-$\Delta^4$-estren - 17β-ol-3-one, 17α-methyl- 10β-carboxy - Δ⁴-estren-17β-ol-3-one, 17α-ethyl-10β-carboxy - Δ⁴-estren - 17β-ol-3-one, 17α-butyl-10β-carboxy-Δ⁴-estren - 17β-ol-3-one, 17α-vinyl-10β-carboxy-Δ⁴-estren-17β-ol-3-one, 17α-ethynyl-10β-carboxy-Δ⁴-estren - 17β-ol-3-one, 17α-fluoroethynyl-10β-carboxy - Δ⁴-estren - 17β-ol-3-one, 17α-chloroethynyl - 10β-carboxy - Δ⁴-estren-17β-ol-3-one, 17α-bromoethynyl - 10β-carboxy - Δ⁴-estren-17β-ol-3-one, 17α-hexynyl-10β-carboxy-Δ⁴-estren - 17β-ol-3-one, Δ⁴-10α-pregnene-3,20-dione-19-oic acid, Δ⁴-pregnene-3,20-dione - 19-oic acid, Δ⁴-10α-pregnen - 17α-ol - 3,20-dione - 19-oic acid, Δ⁴-pregnen - 17α-ol-3,20-dione-19-oic acid, Δ⁴-pregnen - 17α-ol-3,20-dione - 19-oic acid 17-acetate, Δ⁴-pregnen - 17α-ol-3,20-dione - 19-oic acid, 16α-methyl - Δ⁴-10α-pregnene - 3,20-dione-19-oic acid, 16β-methyl-Δ⁴-10α-pregnene - 3,20-dione - 19-oic acid, 16α-methyl-Δ⁴ - 10α-pregnen-17α-ol - 3,20-dione-19-oic acid, 16α,17α-isopropylidenedioxy - Δ⁴ - 10α-pregnene-3,20-dione - 19-oic acid, Δ⁴-pregnen-21-ol-3,20-dione - 19-oic acid, Δ⁴-pregnen - 21-ol-3,20-dione - 19 oic acid 21-acetate, Δ⁴-pregnene - 17α,21-diol - 3,20-dione - 19-oic acid, Δ⁴-pregnene - 17α-21-diol - 3,20-dione - 19-oic acid 21-acetate, 17,20;20,21-bismethylenedioxy - Δ⁴-10α-pregnen - 3-one - 19-oic acid, and the like.

These starting materials are readily prepared from the corresponding 19-hydroxy - Δ⁴-3-keto steroids by the methods set forth in copending U.S. patent application Serial No. 250,480 filed January 10, 1963, in the case of the 10α-carboxy compounds, and in U.S. Patent No. 3,077,482 to Wettstein et al, in the case of 10β-carboxy compounds.

In order that those skilled in the art can more fully understand the present invention, the following examples are set forth. These examples are given solely for the purpose of illustrating the invention, and should not be considered as expressing limitations unless so set forth in the appended claims.

*Example I*

Twenty-five grams of 10β-carboxy-Δ⁴-estrene - 3,17-dione were dissolved in 375 ml. of pyridine containing 25 grams of iodine, and this reaction mixture was then heated gently on a steam bath for 45 minutes. It was noted that when the temperature of the reaction mixture reached 60° C., the evolution of carbon dioxide became apparent, and continued for about 15 minutes. Following the reaction period the reaction mixture was poured slowly into 1 liter of water, and the resulting mixture was then made slightly acidic by the careful addition of aqueous 30% hydrochloric acid thereof. Next, the acidified mixture was extracted with methylene chloride, and the resulting extracts were combined, washed twice with an aqueous 5% sodium thiosulfate solution and then with water, dried over anhydrous sodium sulfate and evaporated to dryness under reduced pressure, thus giving 19-nor-Δ⁴,⁹⁽¹⁰⁾-androstadiene-3,17-dione.

By repeating this procedure in every detail but one, namely, replacing 10β-carboxy-Δ⁴-estrene-3,17-dione with 10α-carboxy-Δ⁴-estren-17β-ol-3-one, Δ⁴ - pregnene - 3,20-dione - 19 - oic acid, Δ⁴-pregnen-17a-ol-3,20-dione-19-oic acid and 17,20;20,21-bismethylenedioxy-Δ⁴-10α-pregnen-3-one-19-oic acid, respectively, the corresponding 19-nor-Δ⁴,⁹⁽¹⁰⁾-3-keto steroids, namely, 19-nor-Δ⁴,⁹⁽¹⁰⁾-androstadien-17β-ol-3-one, 19-nor-Δ⁴,⁹⁽¹⁰⁾-pregnadiene-3,20-dione, 19-nor-Δ⁴,⁹⁽¹⁰⁾-pregnadien-17α-ol-3,20-dione and 17,20;20,21 - bismethylenedioxy - 19 - nor-Δ⁴,⁹⁽¹⁰⁾-pregnadien-3-one, respectively, were obtained.

*Example II*

A solution of 206 grams of 10β-carboxy-Δ⁴-estrene-3,17-dione in 2 liters of α-collidine containing 173.86 grams of iodine was heated for 45 minutes on a steam bath, with the temperature reacting a maximum of 80° C. during this time. Following this reaction period, the reaction mixture was poured into 5 liters of water, and the resulting mixture was made slightly acidic by the careful addition of aqueous 30% hydrochloric acid thereto. Work-up of the acidified mixture in the manner described in Example I hereinabove, followed by crystallization from ethyl acetate/hexane, gave 19-nor-Δ⁴,⁹⁽¹⁰⁾-androstadiene-3,17-dione, identical to the product prepared as described in Example I.

By repeating this procedure in every detail but one, namely, replacing 10α-carboxy-Δ⁴-estrene-3,17-dione with 17α-methyl-10β-carboxy-Δ⁴-estren - 17β - ol-3 - one, 17α-ethynyl-10β-carboxy-Δ⁴-estren-17β-ol-3-one, 16α - methyl-Δ⁴-10α-pregnene-3,20-dione-19-oic acid and 16α-methyl-Δ⁴-10α-pregnen-17α-ol-3,20-dione-19-oic acid, respectively, the corresponding 19-nor-Δ⁴,⁹⁽¹⁰⁾-3-keto steroid, namely, 17α - methyl - 19 - nor-Δ⁴,⁹⁽¹⁰⁾-androstadien-17β-ol-3-one, 17α - ethynyl - 19 - nor-Δ⁴,⁹⁽¹⁰⁾-androstadien-17β-ol-3-one, 16α-methyl-19-nor-Δ⁴,⁹⁽¹⁰⁾-pregnadiene - 3,20 - dione and 16α - methyl-19-nor-Δ⁴,⁹⁽¹⁰⁾-pregnadien-17α-ol-3,20-dione, respectively, were obtained.

It will be obvious to those skilled in the art that other changes and variations can be made in carrying out the present invention without departing from the spirit and scope thereof as defined in the appended claims.

I claim:

1. A process for the preparation of a 19-nor-Δ⁴,⁹⁽¹⁰⁾-steroid which comprises reacting, at a temperature of at least about 50° C., a 10-carboxy-Δ⁴-3-keto steroid, dissolved in an aromatic heterocyclic tertiary amine, with at least about 1 molar equivalent, per molar equivalent of said 10-carboxy steroid, of iodine.

2. A process for the preparttion of a 19-nor-Δ⁴,⁹⁽¹⁰⁾-steroid which comprises reacting, at a temperature of at least about 50° C., a 10-carboxy-Δ⁴-3-keto steroid, dissolved in pyridine, with at least about 1 molar equivalent, per molar equivalent of said 10-carboxy steroid, of iodine.

3. A process for the preparation of a 19-nor-Δ⁴,⁹⁽¹⁰⁾-3-ketoandrostadiene which comprises reacting, at a temperature of at least about 50° C., a 10-carboxy-Δ⁴-3-keto-estrene, dissolved in an aromatic heterocyclic tertiary amine with at least about 1 molar equivalent, per molar equivalent of said 10-carboxy steroid, of iodine.

4. A process for the preparation of a 19-nor-Δ⁴,⁹⁽¹⁰⁾-3-ketoandrostadiene which comprises reacting, at a temperature of at least about 50° C., a 10-carboxy-Δ⁴-3-keto-estrene, dissolved in pyridine, with at least about 1 molar equivalent, per molar equivalent of said 10-carboxy steroid, of iodine.

5. A process for the preparation of a 19-nor-Δ⁴,⁹⁽¹⁰⁾-3-ketoandrostadiene which comprises reacting, at a temperature of at least about 50° C., a 10α-carboxy-Δ⁴-3-keto-estrene, dissolved in pyridine, with at least about 1 molar equivalent, per molar equivalent of said 10-carboxy steroid, of iodine.

6. A process for the preparation of a 19-nor-Δ⁴,⁹⁽¹⁰⁾-3-ketoandrostadiene which comprises reacting, at a temperature of at least about 50° C., a 10β-carboxy-Δ⁴-3-keto-estrene, dissolved in pyridine with at least about 1 molar equivalent, per molar equivalent of said 10-carboxy steroid, of iodine.

7. A process for the preparation of a 19-nor-Δ⁴,⁹⁽¹⁰⁾-3-ketopregnadiene which comprises reacting, at a temperature of at least about 50° C. a 10-carboxy-Δ⁴-3-keto-pregnene dissolved in an aromatic heterocyclic tertiary amine, with at least about 1 molar equivalent, per molar equivalent of said 10-carboxy steroid, of iodine.

8. A process for the preparation of a 19-nor-Δ⁴,⁹⁽¹⁰⁾-3-ketopregnadiene which comprises reacting, at a temperature of at least about 50° C., a 10-carboxy-Δ⁴-3-keto-pregnene, dissolved in pyridine, with at least about 1 molar equivalent, per molar equivalent of said 10-carboxy steroid, of iodine.

9. A process for the preparation of a 19-nor-Δ⁴,⁹⁽¹⁰⁾-3-ketopregnadiene which comprises reacting, at a temperature of at least about 50° C., a 10α-carboxy-Δ⁴-3-keto-pregnene, dissolved in pyridine, with at least about 1 molar equivalent, per molar equivalent of said 10-carboxy steroid, of iodine.

10. A process for the preparation of a 19-nor-Δ$^{4,9(10)}$-3-ketopregnadiene which comprises reacting, at a temperature of at least about 50° C., a 10β-carboxy-Δ$^4$-ketopregnene, dissolved in pyridine, with at least about 1 molar equivalent, per molar equivalent of said 10-carboxy steroid, of iodine.

11. A process for the preparation of 19-nor-Δ$^{4,9(10)}$-androstadiene-3,17-dione which comprises reacting, at a temperature of at least about 50° C., a 10β-carboxy-Δ$^4$-estrene-3,17-dione, dissolved in pyridine, with at least about 1 molar equivalent, per molar equivalent of said 10-carboxy steroid, of iodine.

12. A process for the preparation of 19-nor-Δ$^{4,9(10)}$-pregnadiene-3,20-dione which comprises reacting, at a temperature of at least about 50° C., Δ$^4$-pregnene-3,20-dione-19-oic acid, dissolved in pyridine, with at least about 1 molar equivalent, per molar equivalent of said 10-carboxy steroid, of iodine.

13. A process for the preparation of 19-nor-Δ$^{4,9(10)}$-pregnadien-17α-ol-3,20-dione which comprises reacting, at a temperature of at least about 50° C., a Δ$^4$-pregnen-17α-ol-3,20-dione-19-oic acid, dissolved in pyridine, with at least about 1 molar equivalent, per molar equivalent of said 10-carboxy steroid, of iodine.

14. A process for the preparation of 17α-methyl-19-nor-Δ$^{4,9(10)}$-androstadien-17β-ol-3-one, which comprises reacting, at a temperature of at least about 50° C., a 17α-methyl-10β-carboxy-Δ$^4$-estren-17β-ol-3-one, dissolved in pyridine, with at least about 1 molar equivalent, per molar equivalent of said 10-carboxy steroid, of iodine.

15. A process for the preparation of 17α-ethynyl-19-nor-Δ$^{4,9(10)}$-androstadien-17β-ol-3-one which comprises reacting at a temperature of at least about 50° C., a 17α-ethynyl-10β-carboxy-Δ$^4$-estren-17β-ol-3-one dissolved in pyridine, with at least about 1 molar equivalent, per molar equivalent of said 10-carboxy steroid, of iodine.

References Cited by the Examiner

Windholz et al.: Angew. Chem., Internat. Edt. vol. 3, No. 5 (1964), pages 353–366.

LEWIS GOTTS, *Primary Examiner.*